(12) United States Patent
Bruno et al.

(10) Patent No.: US 7,886,479 B2
(45) Date of Patent: Feb. 15, 2011

(54) RODENT TRAP HAVING COMPRESSIVE TRAPPING MEMBERS

(75) Inventors: Robert Bruno, Avon, CT (US); Matthew L. Phillips, Litchfield, CT (US); Lynn Briggs, Bristol, CT (US); Thomas Paul Danniger, Ostrander, OH (US); Richard Gene Foster, Powell, OH (US)

(73) Assignee: SMG Brands, Inc., Wilmington, DE (US)

( * ) Notice: Subject to any disclaimer, the term of this patent is extended or adjusted under 35 U.S.C. 154(b) by 418 days.

(21) Appl. No.: 11/956,912

(22) Filed: Dec. 14, 2007

(65) Prior Publication Data

US 2009/0151222 A1    Jun. 18, 2009

(51) Int. Cl.
  *A01M 23/02* (2006.01)
(52) U.S. Cl. .......................................... 43/67
(58) Field of Classification Search ................ 43/67.76, 43/66; *A01M 12/02*
  See application file for complete search history.

(56) References Cited

U.S. PATENT DOCUMENTS

| | | | |
|---|---|---|---|
| 83,074 A | 10/1868 | McClure | |
| 441,677 A | 12/1890 | Lovell | |
| 691,301 A | 1/1902 | Tschantre | |
| 982,486 A | 2/1911 | Edwards | |
| 1,281,876 A | 10/1918 | Taylor | |
| D57,320 S | 3/1921 | Dorsch | |
| 1,587,536 A | 6/1926 | Lobit | |
| 1,677,470 A | 7/1928 | Dorsch et al. | |
| 2,195,484 A * | 4/1940 | George ........................ 43/76 |
| 2,529,589 A | 11/1950 | Biery | |
| 4,030,230 A | 6/1977 | Souza | |
| 4,127,958 A | 12/1978 | Peters et al. | |
| 4,144,667 A | 3/1979 | Souza | |
| 4,151,673 A * | 5/1979 | Campbell ........................ 43/67 |
| 4,231,180 A | 11/1980 | Bare | |
| 4,245,423 A | 1/1981 | Souza et al. | |

(Continued)

FOREIGN PATENT DOCUMENTS

EP    0280504    8/1988

(Continued)

OTHER PUBLICATIONS

International Search Report Dated Jan. 15, 2009 for International Application No. PCT/US08/85676.

(Continued)

*Primary Examiner*—Son T Nguyen
*Assistant Examiner*—Shadi Baniani
(74) *Attorney, Agent, or Firm*—Hunton & Williams LLP (57) ABSTRACT

A trap having a first housing member slideably engaged with a second housing member, to provide a collapsible trapping enclosure therebetween. The trap has an opening that provides a passageway to the trapping enclosure, such as an opening disposed in one of the first and second housing members. The trap has an open position and a closed position. In the open position, the opening is unobstructed so that an animal may enter and exit the trapping enclosure. In the closed position, the opening is substantially blocked. A trigger is located inside the trap, so that when the trigger is triggered by an animal, the trap moves to its closed position, enclosing the animal inside.

16 Claims, 8 Drawing Sheets

U.S. PATENT DOCUMENTS

| | | | |
|---|---|---|---|
| 4,253,264 A | | 3/1981 | Souza |
| 4,363,184 A | * | 12/1982 | Marcolina ..................... 43/85 |
| 4,769,942 A | | 9/1988 | Copenhaver, Sr. |
| 4,803,799 A | | 2/1989 | Vajs et al. |
| D300,163 S | | 3/1989 | Landell et al. |
| 4,852,294 A | | 8/1989 | Langli |
| 4,856,225 A | | 8/1989 | Radesky et al. |
| 4,858,373 A | | 8/1989 | Combs |
| 4,926,581 A | | 5/1990 | Grivas |
| 5,040,327 A | | 8/1991 | Stack et al. |
| 5,044,111 A | * | 9/1991 | Lindros, Jr. .................... 43/61 |
| 5,044,113 A | | 9/1991 | Stack et al. |
| 5,148,624 A | | 9/1992 | Schmidt |
| 5,172,512 A | | 12/1992 | Bodker et al. |
| D346,199 S | | 4/1994 | Spragins et al. |
| 5,337,512 A | | 8/1994 | Krenzler |
| 5,384,981 A | | 1/1995 | Cohen |
| 5,398,442 A | | 3/1995 | Musket |
| 5,448,852 A | | 9/1995 | Spragins et al. |
| 5,471,781 A | | 12/1995 | Vine |
| 5,477,636 A | | 12/1995 | Musket |
| 5,481,824 A | | 1/1996 | Fiore, Jr. |
| 5,572,825 A | | 11/1996 | Gehret |
| 5,577,342 A | | 11/1996 | Johnson et al. |
| D385,611 S | | 10/1997 | Prince et al. |
| D386,554 S | | 11/1997 | Brewer |
| 5,692,336 A | | 12/1997 | Fiore, Jr. et al. |
| 5,746,020 A | | 5/1998 | Fiore, Jr. et al. |
| 5,806,237 A | | 9/1998 | Nelson et al. |
| D409,711 S | | 5/1999 | Johnson |
| 5,950,353 A | | 9/1999 | Johnson et al. |
| 6,047,494 A | | 4/2000 | Johnson et al. |
| D441,828 S | | 5/2001 | Leyerle et al. |
| 6,248,730 B1 | | 6/2001 | Poché |
| 6,266,917 B1 | | 7/2001 | Hight |
| 6,389,738 B1 | | 5/2002 | Denny et al. |
| D459,428 S | | 6/2002 | Johnson et al. |
| 6,397,517 B1 | | 6/2002 | Leyerle et al. |
| 6,415,544 B1 | | 7/2002 | Leyerle et al. |
| 6,481,151 B1 | | 11/2002 | Johnson et al. |
| 6,493,988 B1 | | 12/2002 | Johnson |
| 6,508,031 B1 | | 1/2003 | Johnson et al. |
| 6,574,912 B1 | | 6/2003 | Johnson |
| 6,594,948 B1 | | 7/2003 | Novack |
| 6,609,328 B2 | | 8/2003 | Swift et al. |
| 6,622,422 B2 | | 9/2003 | Gehret et al. |
| 6,631,582 B2 | | 10/2003 | Knuppel et al. |
| D485,597 S | | 1/2004 | Turner |
| 6,684,560 B2 | | 2/2004 | Lafforthun |
| 6,691,452 B1 | | 2/2004 | Knuppel et al. |
| 6,694,669 B2 | | 2/2004 | Gehret et al. |
| 6,735,899 B1 | | 5/2004 | Anderson et al. |
| 6,775,947 B2 | | 8/2004 | Anderson et al. |
| 6,796,081 B2 | | 9/2004 | Anderson et al. |
| 6,807,768 B2 | | 10/2004 | Johnson et al. |
| 6,836,999 B2 | | 1/2005 | Rich et al. |
| 6,938,368 B2 | | 9/2005 | Guidry |
| 6,955,007 B2 | | 10/2005 | Gehret et al. |
| 6,990,766 B2 | | 1/2006 | Gehret et al. |
| D514,655 S | | 2/2006 | Rodgers et al. |
| D515,175 S | | 2/2006 | Mayo et al. |
| 7,010,882 B2 | | 3/2006 | Rich et al. |
| 7,069,688 B2 | | 7/2006 | Hill |
| 7,089,701 B2 | | 8/2006 | Frisch |
| D529,571 S | | 10/2006 | Hoyes |
| 7,171,777 B2 | | 2/2007 | Welin-Berger |
| 7,219,466 B2 | | 5/2007 | Rich et al. |
| 7,231,738 B2 | | 6/2007 | Watson et al. |
| 2003/0215481 A1 | | 11/2003 | Borchert et al. |
| 2004/0025410 A1 | | 2/2004 | Shapland |
| 2004/0088903 A1 | | 5/2004 | Poche |
| 2004/0244274 A1 | | 12/2004 | Dellevigne et al. |
| 2005/0279015 A1 | | 12/2005 | Hall |
| 2006/0032110 A1 | | 2/2006 | Yang |
| 2006/0042153 A1 | | 3/2006 | Bowerman |
| 2006/0053682 A1 | | 3/2006 | Goldstein |
| 2006/0117644 A1 | | 6/2006 | Hoyes et al. |
| 2006/0156615 A1 | | 7/2006 | Hale |
| 2006/0156617 A1 | | 7/2006 | Hale |
| 2006/0265941 A1 | | 11/2006 | Newton |
| 2006/0272197 A1 | | 12/2006 | Wiesener et al. |
| 2007/0017148 A1 | | 1/2007 | Blau |
| 2007/0017149 A1 | | 1/2007 | Rodgers et al. |
| 2007/0277426 A1 | * | 12/2007 | Wolfgram ..................... 43/67 |
| 2008/0120896 A1 | * | 5/2008 | Johnson ........................ 43/67 |

FOREIGN PATENT DOCUMENTS

| | | |
|---|---|---|
| EP | 0553336 | 8/1993 |
| EP | 0745323 | 12/1996 |
| EP | 0806138 | 11/1997 |
| EP | 1149530 | 10/2001 |
| GB | 2329125 | 3/1999 |
| GB | 2384966 | 8/2003 |
| JP | 6165630 | 6/1994 |
| WO | WO 02/102147 | 12/2002 |
| WO | WO 03/059057 | 7/2003 |
| WO | WO 2005/022992 | 3/2005 |
| WO | WO 2005/072524 | 8/2005 |

OTHER PUBLICATIONS

International Preliminary Report On Patentability Date Jun. 24, 2010 for PCT/US2008/085676.

* cited by examiner

RODENT TRAP HAVING COMPRESSIVE TRAPPING MEMBERS

BACKGROUND

1. Field of the Invention

The present embodiments relate to an animal trapping device in general, and more particularly to a rodent trap having two housing members that, when triggered by a rodent, collapse together to enclose the rodent within the trap.

2. Description of Related Art

Conventional animal traps are not always self contained. In other words, in conventional traps the trapping mechanism, and therefore the trapped animal, are open to the environment so that they are visible to and accessible from the environment. For example, in conventional rodent traps having a spring loaded wicket trap or "glue trap," the "trapped" rodent is visible. When the rodent is trapped, it is often still alive. Thus making disposal of the trap difficult and uncomfortable for some people. In addition, because these type of traps are not self-contained children and/or pets may accidentally trigger the traps and/or get caught in the trap. For example, a dog may attempt to eat the bait on the spring loaded wicket trap and have the wicket come down on the dog's snout. With respect to glue traps, a child may step on the trap and have a difficult time removing the trap and/or glue. These and other problems are known to exist with conventional traps.

The description herein of certain advantages and disadvantages of known methods and devices is not intended to limit the scope of the present invention. Indeed, the present embodiments may include some or all of the features described above without suffering from the same disadvantages.

SUMMARY

In view of the foregoing, one or more embodiments include a trap that securely traps a rodent, such as a mouse, within an enclosure. The enclosure can have limited external accessibility and visibility, thus the trap and rodent can be disposed of without seeing and/or touching the rodent.

In accordance with one embodiment, a rodent trap is provided, that has an open position and a closed position. The rodent trap includes a first housing member and a second housing member that are slidingly engaged, and define a collapsible trapping enclosure therebetween. At least one opening is provided in one of the housing members, providing a passageway to the trapping enclosure. In the trap's open position, the opening is substantially unobstructed. In the trap's closed position, the opening is substantially obstructed. The trap also has a trigger that, when triggered by a rodent, causes the trap to move between the open position and the closed position, by causing the first housing member, the second housing member, or both, to slide, causing the trapping enclosure to collapse.

In another embodiment, a rodent trap having an open and closed position may have a first housing member and a second housing member that are slidingly engaged, and define a collapsible trapping enclosure therebetween. At least one opening is provided in one of the housing members, providing a passageway into the trapping enclosure. In the trap's open position, the opening is substantially unobstructed. In the trap's closed position, the opening is substantially obstructed. The trap also has a biasing mechanism operably coupled with the first and second housing members, biasing the trap towards the closed position, and a latch that, when latched, holds the trap in the open position. The trap has a trigger disposed at least partially inside the trapping enclosure that, when triggered by a rodent, causes the trap to move from its open position to its closed position by releasing the latch from its latched position.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other exemplary embodiments and advantages will become apparent from the following detailed description, taken in conjunction with the accompanying drawings, illustrating by way of example the principles of the various exemplary embodiments.

DETAILED DESCRIPTION OF PREFERRED EXEMPLARY EMBODIMENTS

The following description is intended to convey a thorough understanding of the embodiments by providing a number of specific embodiments and details involving an animal trap. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Generally speaking, the animal traps of the various exemplary embodiments described herein have a compressible or collapsible trapping enclosure. An animal may enter the collapsible trapping enclosure through an opening. Inside the trap, a bait or attractant may draw the animal toward a trigger. When the trigger is manipulated by the animal the trapping enclosure collapses, closing the opening and trapping the mouse inside.

The various exemplary embodiments generally described devices that "trap" an animal, e.g., a rodent. In the various embodiments, the animal may simply be trapped inside the device so that it cannot escape from the device. However, the embodiments are not so limited. In various embodiments, the trapped animal may be immobilized, injured or killed. For example, in various exemplary embodiments, the trapped animal may be immobilized inside the device by the device itself or by one or more immobilizing elements inside the device. Where the trapped animal is a mouse, immobilizing the mouse may cause the mouse to develop hypothermia which may eventually kill the mouse. In other embodiments, the device may injure the trapped animal, such as by crushing it, or impaling it. In other embodiments, the trapped animal may suffer a fatal injury, such as a broken neck.

Figure 1A:
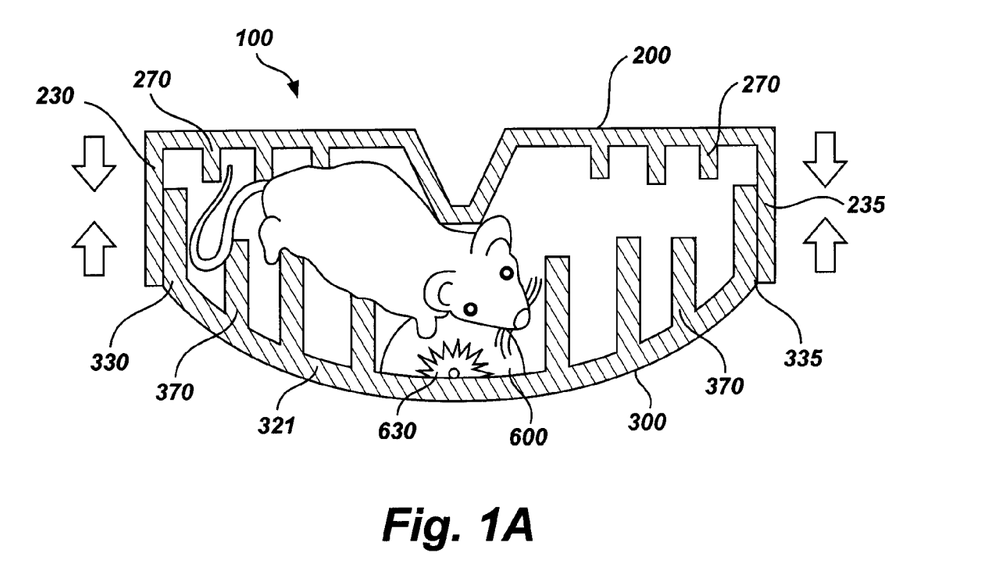
FIG. 1A depicts a top view of a trap illustrated in the closed position, in accordance with an exemplary embodiment.
Figure 1B:
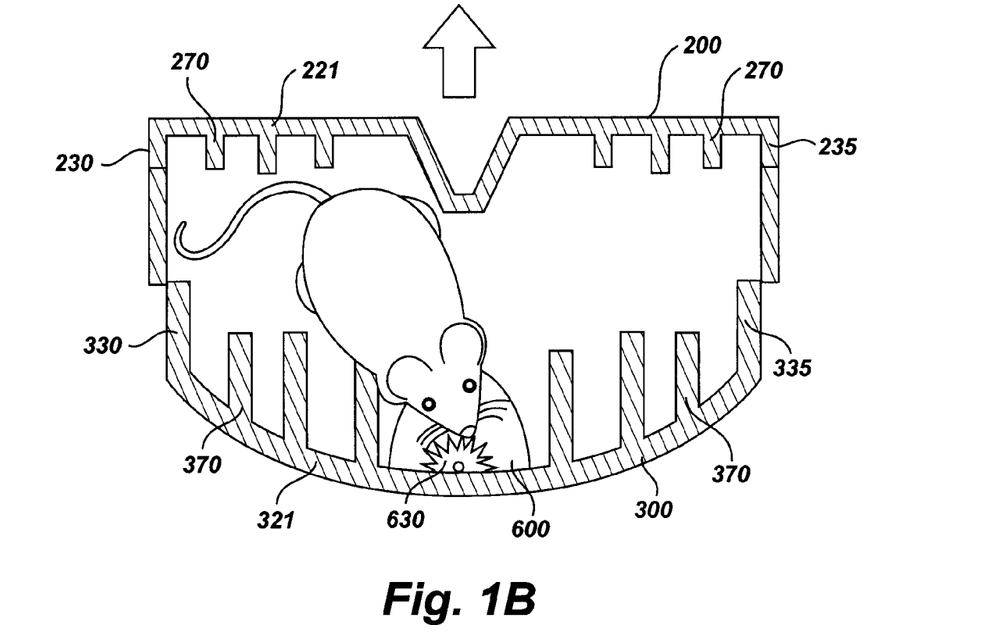
FIG. 1B depicts a top view of a trap illustrated in the open position, in accordance with an exemplary embodiment.
Figure 2:
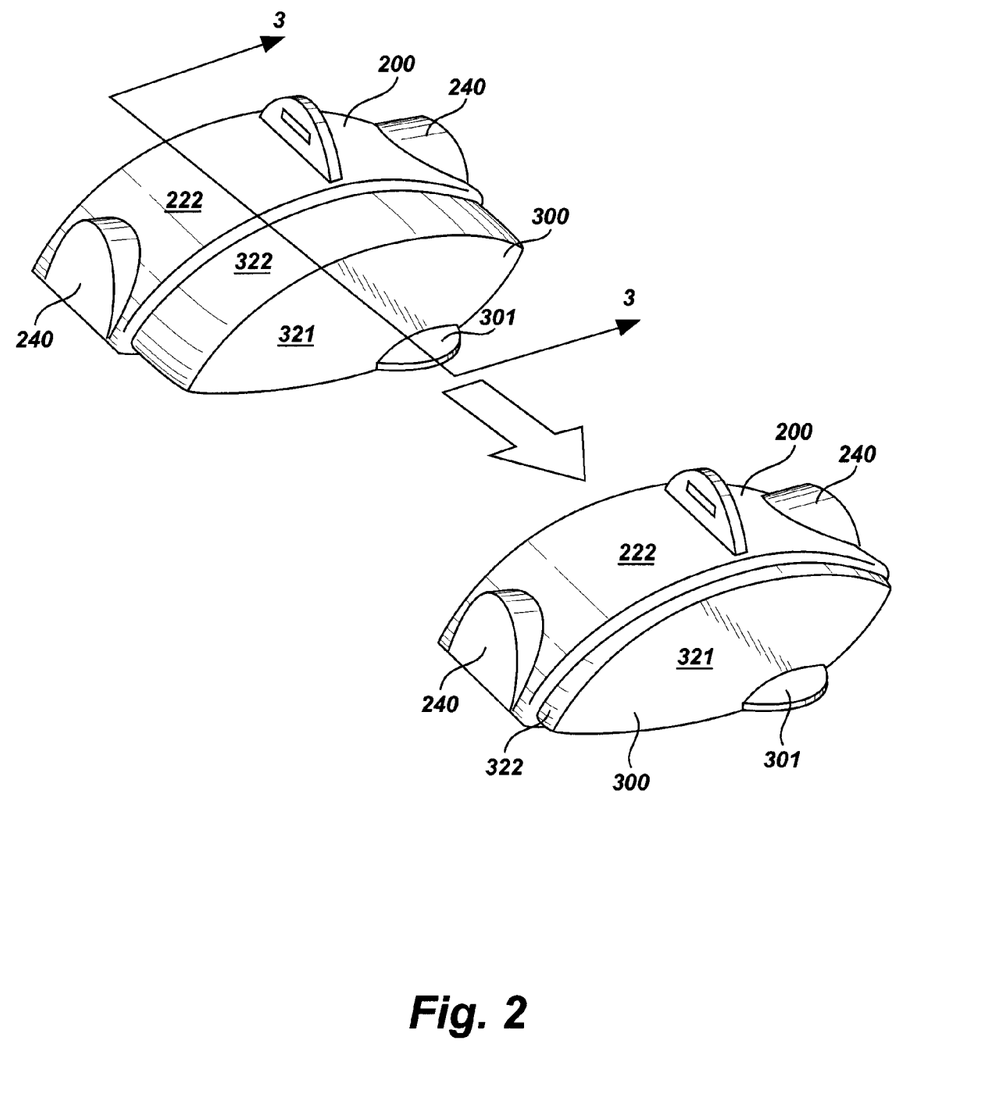
FIG. 2 depicts a perspective view of a trap illustrated in the open and closed position, in accordance with an exemplary embodiment.

In the exemplary embodiments illustrated in FIGS. 1A, 1B, and 2, trap 100 may have a first housing member 200, and a second housing member 300, which may be slideably engaged. It should be appreciated that all of the drawing figures illustrate a simplified view of an exemplary trap 100, and its components, and that trap 100 may include additional elements that are not depicted. Generally speaking, the trap 100 may initially be set to an open position such as by sliding first housing member 200 and/or second housing member 300 apart, and latching the members this position. Trap 100 may have at least one opening 240, that provides a passageway for an animal to enter the trap 100. When an animal enters the trap, and actuates a trigger, the first and/or second housing members 200, 300 collapse towards each other, thereby causing the trap 100 to move to a closed position. In the closed position, the at least one opening 240 is substantially blocked so that the animal is enclosed within the trap 100, and is unable to escape. In addition, the animal may be immobilized by one or more immobilizing members 270, 370, within the first and/or second housing member 200, 300. Various means for configuring and operating the trap 100 are described below.

Figure 6:
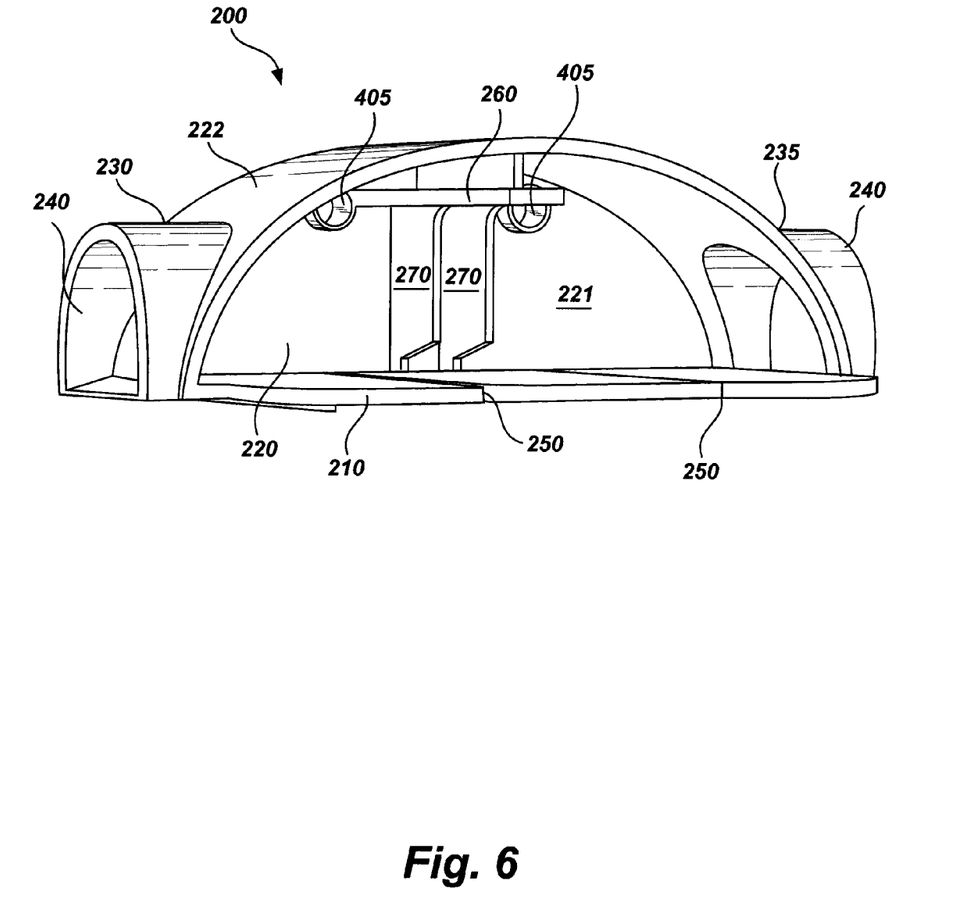
FIG. 6 depicts a perspective view of a first housing member in accordance with an exemplary embodiment.

In an exemplary embodiment illustrated in FIG. 6, first housing member 200 may have a partial enclosure 200, such as one defined by a base 210, a side wall 221, and an upper wall 222. In exemplary embodiments, at least one side of the partial enclosure 200 may be partially open. The partial enclosure 220 may have two ends 230 and 235. In various exemplary embodiments, the first housing member 200 may be rigid or substantially rigid. In other embodiments, at least a part of the first housing member 200 is rigid or substantially rigid.

Figure 7:
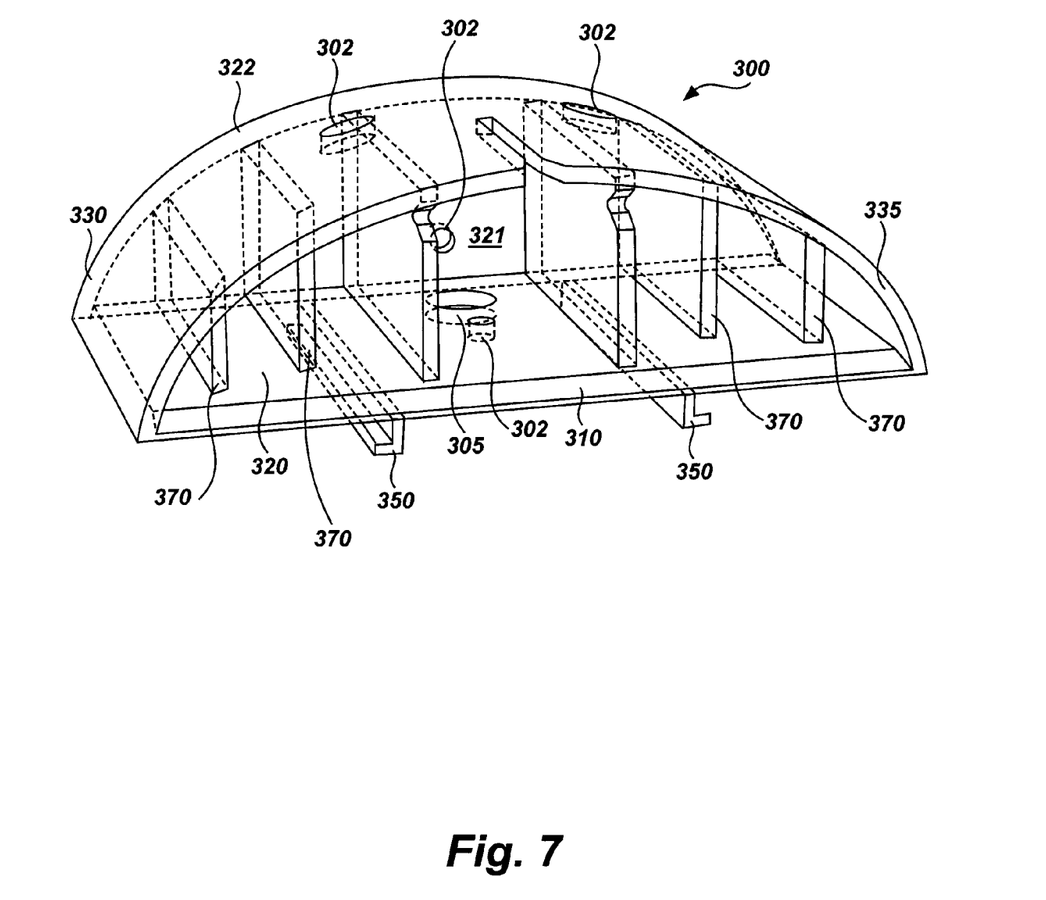
FIG. 7 depicts a perspective view of a second housing member in accordance with an exemplary embodiment.

In an exemplary embodiment illustrated in FIG. 7, second housing member 300 may have a partial enclosure 320, such as one defined by a base 310, a side wall 321, and an upper wall 322. In exemplary embodiments, at least one side of the partial enclosure 320 may be at least partially open. The partial enclosure may have two ends 330 and 335. In various exemplary embodiments, the second housing member 300 may be rigid or substantially rigid. In other embodiments, at least a part of the second housing member 300 is rigid or substantially rigid.

In exemplary embodiments, the partial enclosure 220 may have at least one opening 240, in at least one of the ends 230, 235, providing a passageway for an animal to enter the trap 100. As illustrated in FIGS. 1A, 1B, and 2, in various exemplary embodiments, first housing member 200 may have two openings 240 with each opening 240 disposed in an end 230, 235 of the first housing member 200. In some embodiments, the openings 240 may be disposed on opposite ends 230, 235 of the housing member 200 so that they may provide a line of sight between the two openings 240. It is understood that one or more openings 240 may optionally be provided in partial enclosure 320, in the same or similar manner.

In various exemplary embodiments, the first housing member 200 and second housing member 300 may be reversed so that the second housing member 300 may have the components described herein with respect to first housing member 200, and the first housing member 200 may have the components described herein with respect to the second housing member 300. In other embodiments, housing members 200, 300 may have the same components, such as a combination of the components described herein with respect to the first and second housing members 200, 300.

In various exemplary embodiments, trap 100 may be configured so that side 221, and side 321 are on opposite sides of the trap 100. When first and second housing members 200, 300 are slidably engaged, they provide a trapping enclosure, substantially defined by the combination of the first enclosure 220, and second enclosure 330. The one or more openings 240 in the trap 100, thereby provide a passageway for an animal to enter the trap 100.

In various embodiments, trap 100 may have an collapsible or compressible trapping enclosure. In some embodiments, first housing member 200 and second housing member 300 may be slideably engaged with each other to define a collapsible trap enclosure therebetween. For example, the first housing member 200 and second housing member 300, may be configured so that one or both of the housing members 200 and 300 may slide between a closed position and an open position, without the two members becoming disengaged. As one or both members 200, 300 slide toward the open position, side walls 221 and 321 to move apart, expanding the trapping enclosure. In the open position, one or more openings 240 in the trap 100 may be substantially unblocked, providing a passageway to the trapping enclosure. As one or both members 200, 300 slide toward the closed position, the side walls 221 and 321 to move toward each other, collapsing the trapping enclosure. In the closed position, ends 330, 335 may substantially close or block the one or more openings 240 in the first housing member 200, as illustrated in FIG. 1-A. In the closed position, the passageways are blocked, trapping an animal inside.

In various exemplary embodiments, the distance that the first housing member 200 may slide relative to the second housing member 300 when moving from the open position to the closed position should be at least the width of the one or more openings 240.

Figure 8:
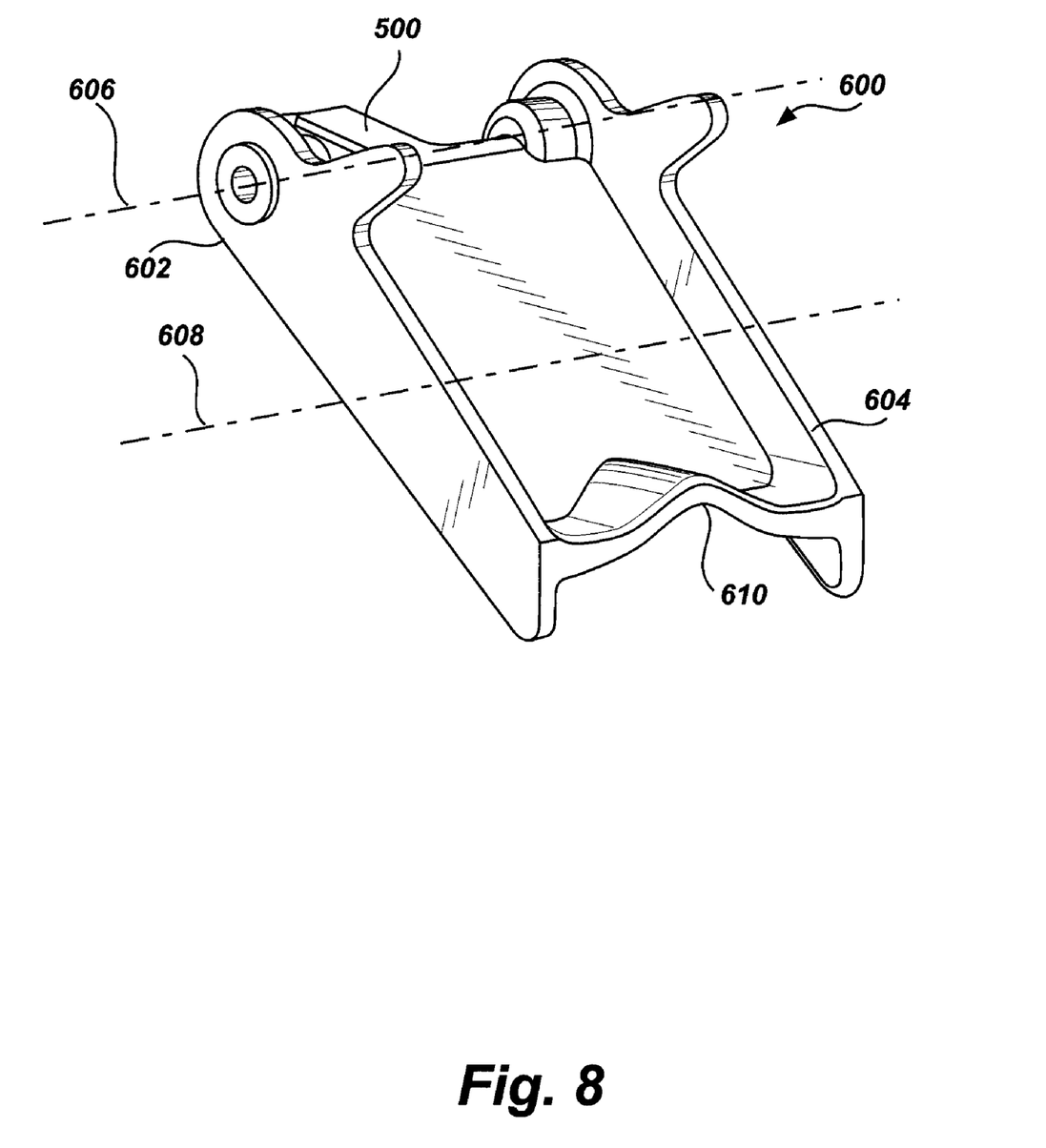
FIG. 8 depicts a perspective view of a trigger, in accordance with an exemplary embodiment.

In the exemplary embodiments illustrated in FIGS. 7 and 8, first housing member 200 and second housing member 300 may be configured to slideably engage along one or more surfaces, such as at their respective base members 210, 310. In the exemplary embodiments, first housing member 200 may have one or more grooves 250 in the base 210, while second housing member 300 may have one or more corresponding rails 350 extending from its base 310. In exemplary embodiments, when the first housing member 200 and second housing member 300 are slideably engaged, the rails 350 may glide back and forth inside grooves 250. It is appreciated that the slideably engaging mechanisms of the first and second housing members 200, 300 may be interchangeable—in other words, second housing member 300 may include grooves, and first housing member 200 may include corresponding rails. Furthermore, it is appreciated that there are various other mechanisms, such as tubes and bosses, that would enable first housing member 200 and second housing member 300 to be slideably engaged with respect to each other, and that these mechanisms may be disposed on one or more surfaces of the first and second housing members 200, 300.

Figure 3:
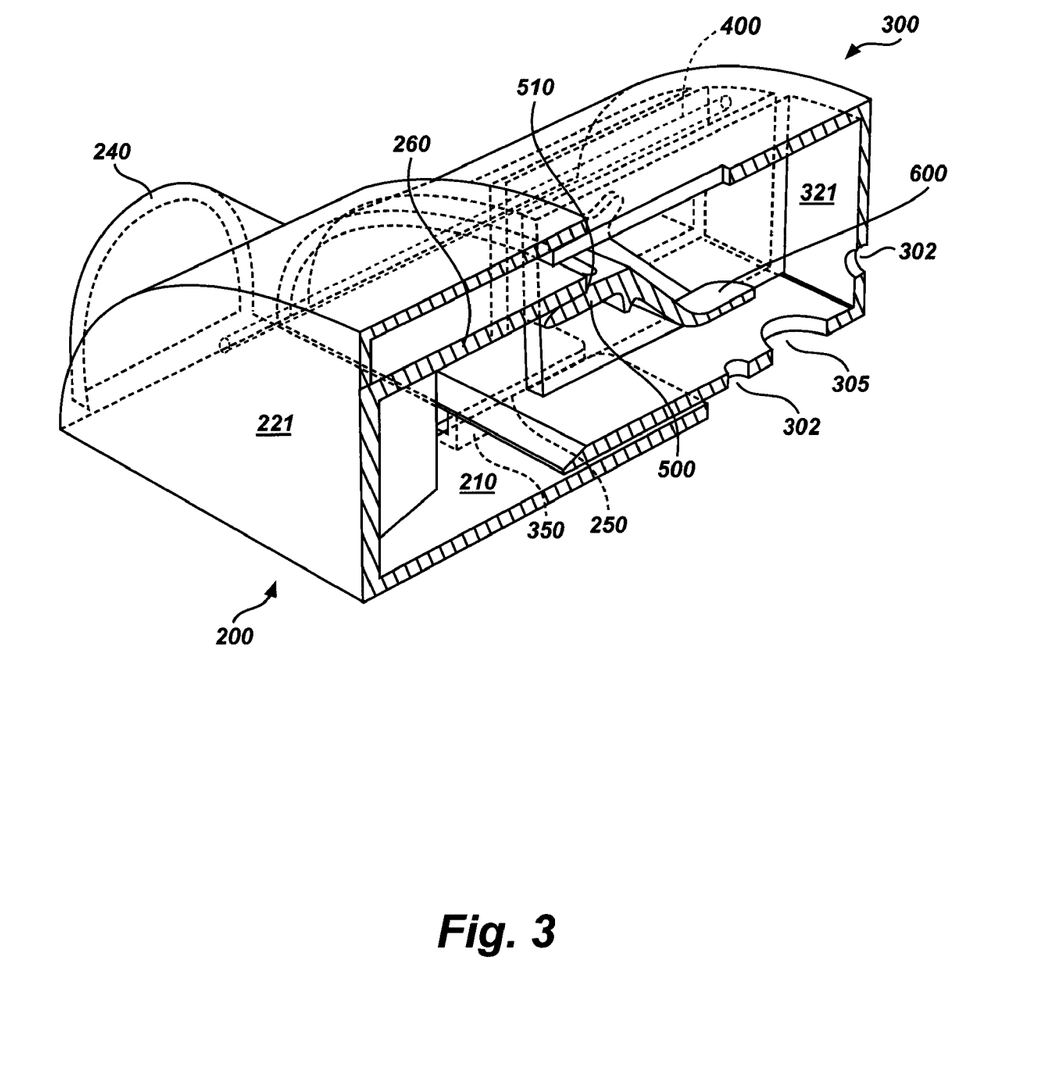
FIG. 3 depicts a perspective view of a trap illustrated in the open position, as viewed along 3-3 of FIG. 2, in accordance with an exemplary embodiment.

In various exemplary embodiments, first housing member 200 and second housing member 300 may have a size and shape that enables the housing members 200, 300 to at least partially nest together. For example, FIGS. 1-3 illustrate an exemplary embodiment in which second housing member 300 may nest inside first housing member 200. In a nested configuration, it is preferred that the overall shape of the housing members are similar, with one enclosure fitting closely inside the other, to provide relatively small gaps between the two housing members when they are nested together. At a maximum, the gaps between nested housing members 200 and 300 should be sufficiently small so that an animal cannot fit through the gaps. For example, as illustrated in FIG. 3, when the two housing members 200, 300 are nested, the upper wall 322 of second housing member 300 may fit closely against the upper wall 222 of first housing member 200, with only a slight clearance between them. It will be appreciated that in various other embodiments, the first and second housing members 200, 300 may nest together in various other configurations, including partial nesting of one or more of the surfaces.

In various exemplary embodiments, the trap 100 may be biased toward the closed position, and a latching mechanism 500 may be provided so that a user can initially set the trap 100 to the open position, so that an animal may enter the trap 100, such as through one or more openings 240. In exemplary embodiments, the trap 100 may include a triggering mechanism 600 disposed at least partially inside the trap. When triggering mechanism 600 is triggered by an animal it releases the latching mechanism 500 from its latched position, and the biasing forces move the trap 100 to its closed position, trapping the animal inside.

In exemplary embodiments, the trap 100 may have a biasing mechanism 400 that biases the trap 100 toward the closed position. In various exemplary embodiments, the trap 100 may have a biasing mechanism 400, operably coupled with first and second housing members 200, 300, that may provide constant tension between the two housing members 200 and 300, tending to pull them toward the closed position. For example, the biasing mechanism 400 may include one or more springs joined on one end to the first housing member 200, such as through spring attachment holes 405, illustrated in FIG. 6, and on the opposite end to the second housing member 300. It will be appreciated that other suitable biasing mechanisms may be provided in addition to or as an alternative to those described herein, to provide a biasing force between housing members 200 and 300, such as, for example, an elastomeric material stretched between or around the housing members 200, 300.

To initially set the trap 100 to the open position, a force may be applied to one or both of the housing members 200 and 300, overcoming the biasing force and sliding one or both of the housing members 200 and 300 into the open or set position. For example, a user of the trap 100 may pull on the second housing member 300 to slide it away from first housing member 200 until the trap 100 is in the open position. It will be appreciated that in various exemplary embodiments, an opening means or gripping means may be provided to slide the first and/or second housing members to the open or set position, or assist in the movement of one or both of the housing members to the open or set position. For example, in the exemplary embodiment illustrated in FIG. 2, a finger tab 301 may be provided on the side of second housing member 300. The finger tab 301 may be configured so that a user of the trap may grab the second housing member and pull it away from the first housing member 200. In other exemplary embodiments, such as one illustrated in FIG. 3, one or more finger gripping holes 302 may be provided on one or more of the base portions 210, 310, sides 321, 221 or upper walls 322, 222 that provides a region for the user to grip and slide the first and second housing members 200, 300 toward their open position. It will be appreciated that other means and devices may be used to provide a gripping region, including various types of lips, grooves, protrusions, depressions, or other such devices that improve the user's ability to grip and slide the housing members 200, 300.

Figure 4:
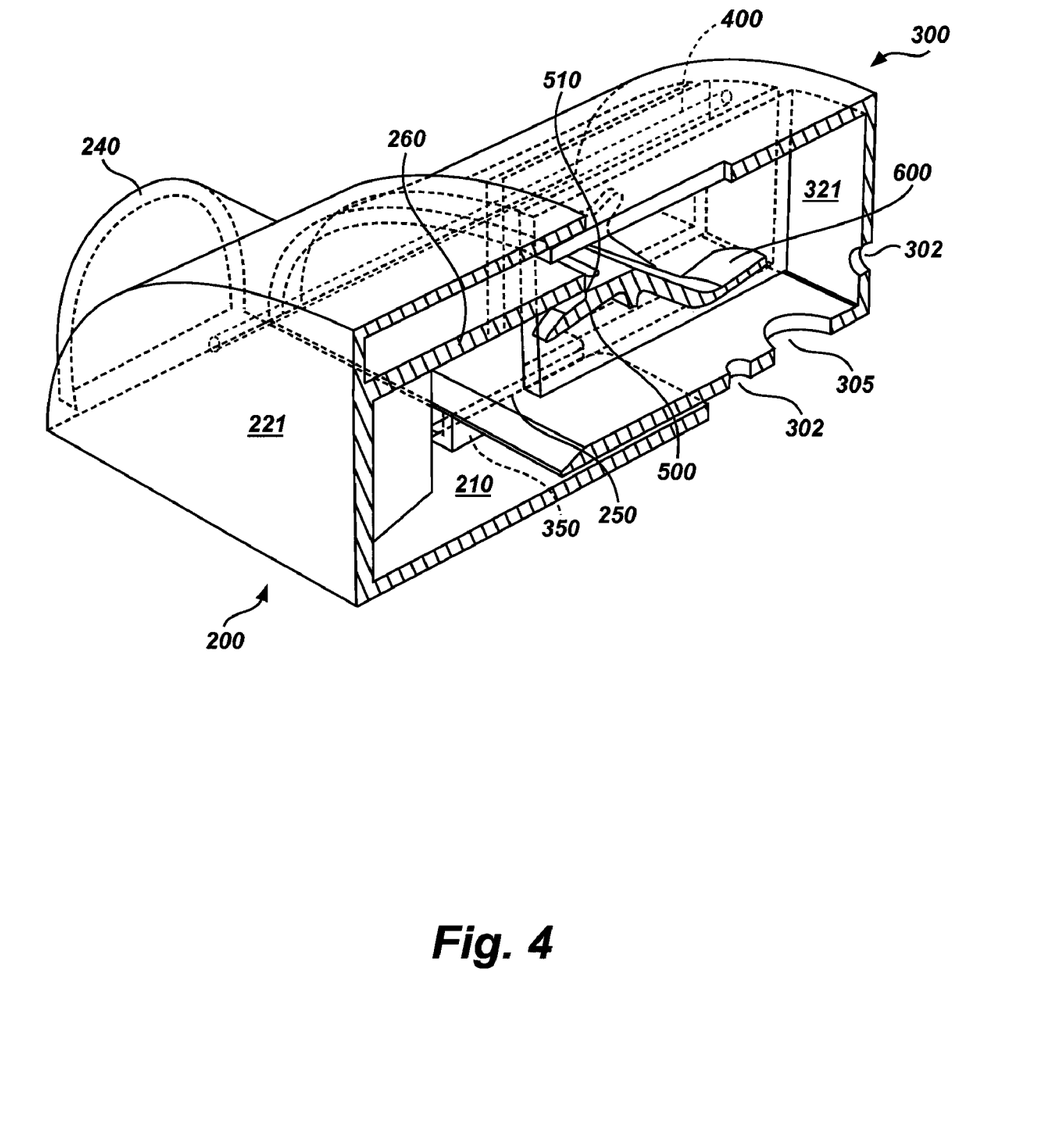
FIG. 4 depicts a perspective sectional view of a rodent illustrated in the unlatched position, as viewed along 3-3 of FIG. 2, in accordance with an exemplary embodiment.
Figure 5:
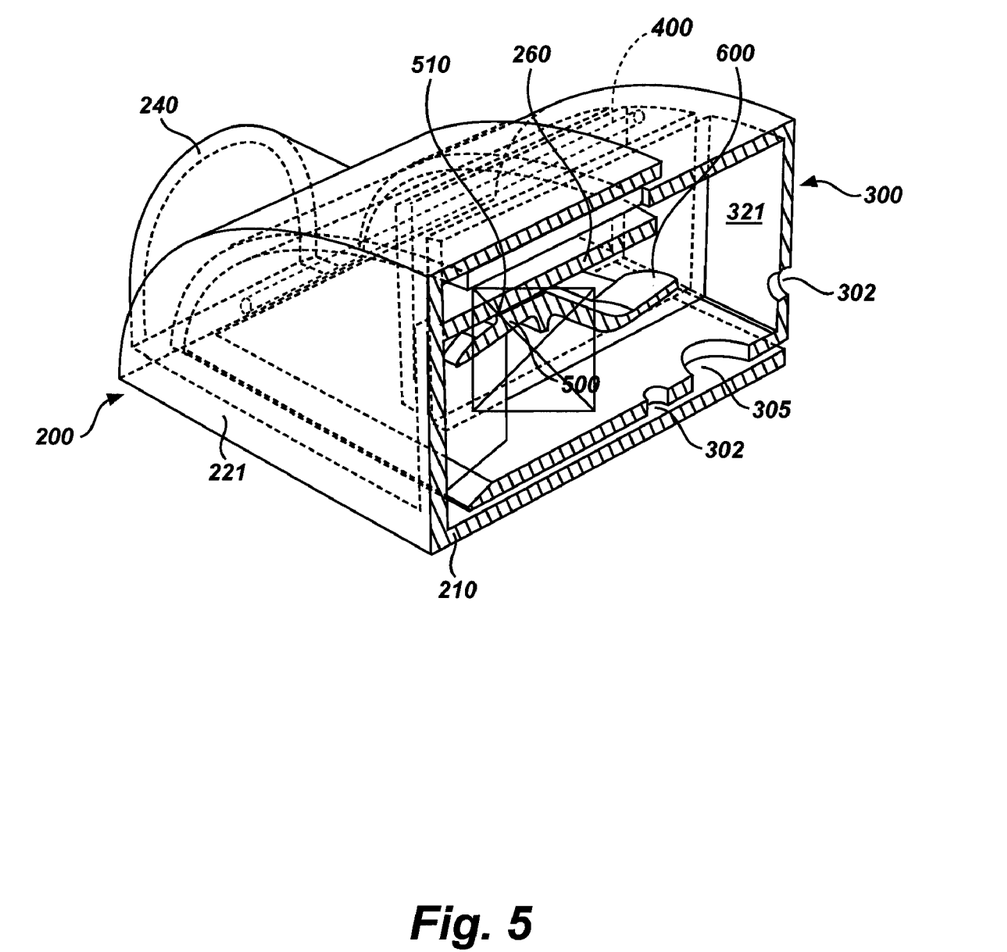
FIG. 5 depicts a perspective sectional view of a trap illustrated in the closed position, as viewed along 3-3 of FIG. 2, in accordance with an exemplary embodiment.

To maintain the trap 100 in the open position, a latching mechanism 500 may be provided. For example, as shown in FIGS. 3-5, latching member 500 may be joined with second housing member 300, extending between first housing member 200 and second housing member 300. In a latched position, latching member 500 may have a prong 510 that may rest against an edge or surface of first housing member 200, to hold the two housing members 200, 300 in an open position. The latching mechanism 500 may be configured so that the latching member 500 latches with any suitable portion of first housing member 200, or against a separate latching member, such as latching flange 260, illustrated in FIG. 6. In some exemplary embodiments, the latching member 500 may be biased towards its latched position, so that, for example, when the first and second housing members 200, 300 are slid toward the open position, the latching member 500 automatically moves to its latched position, without further user intervention. It will be appreciated that other latching mechanisms may be provided to latch the first and second housing members 200, 300 in their open positions.

In exemplary embodiments, a triggering mechanism 600 may be provided that causes the trap 100 to move from the open position to the closed position. For example, a triggering mechanism 600 may be provided that releases latching mechanism 500 from its latched position, enabling the biasing mechanism 400 to move the trap 100 to the closed position. The triggering mechanism 600 may be at least partially disposed inside the trap 100, and may be adapted to be actuated by an animal inside the trapping enclosure. For example, in the exemplary embodiment shown in FIG. 1B, the triggering mechanism 600 may be provided inside the second housing member 300. The triggering mechanism 600 according to an exemplary embodiment is illustrated in FIG. 8. In this exemplary embodiment, the triggering mechanism 600 may have a latching portion 602, and an actuation portion 604. The triggering mechanism 600 may be pivotally coupled with the second housing member 300, so that it may pivot about pivot axis 606. The triggering mechanism 600 may be configured so that when an animal pushes against the triggering mechanism 600, the latching portion 602 rotates about the axis, releasing the latch member 500 from its latched position.

In various exemplary embodiments, an attractant 630 may be provided inside the trap 100. The attractant 630 may entice an animal to enter the trap 100, and to move toward the triggering mechanism 600, so the animal may manipulate the triggering mechanism 600. In exemplary embodiments, triggering mechanism 600 may be disposed at least partially between the one or more openings 240 and the attractant 630. As the animal attempts to access the attractant 630, it will likely push against or nuzzle the triggering mechanism 600, causing the triggering mechanism 600 to pivot about pivot axis 606. Simultaneously, the latching portion 602 of the triggering mechanism 600, will rotate about pivot axis 606, and will eventually cause the release of latching member 500 from latching flange 260. When the latching mechanism 500 releases, the trap 100 moves to its closed position.

It is appreciated that any suitable attractant 630 may be provided to entice an animal into the trap 100, and toward the triggering mechanism 600. For example, attractant 630 may include a bait, such as a food or chemical bait, a fragrance, a rodenticide, or other suitable means for attracting the animal toward the rear portion of the second housing member 300. In exemplary embodiments, the trap 100 may be provided to the user with an attractant 630 already installed. For example, when a user obtains the trap 100, an attractant 630 may be disposed in the first or second housing portion 200, 300. In certain exemplary embodiments, the trap 100 may be provided with an attractant 630, but the user exposes the attractant 630 prior to use. For example, the attractant 630 may be provided in the trap 100 with a plastic or foil wrapper that should be removed by the user prior to use, or the attractant 630 may be provided in a blister pack to which the user should apply pressure in order to expose the attractant 630. In certain exemplary embodiments, the user may expose the attractant 630 from outside of the trap 100. In other exemplary embodiments, the trap 100 may be provided with one or more means for inserting the attractant 630 into the trap 100, or replacing old or spent attractant 630. For example, in the exemplary embodiment illustrated in FIG. 3, one or more cutaways 305 may be provided to insert an attractant 630, or remove and replace an attractant 630. Where such a cutaway is provided, the cutaway 305 should be small enough so as not to provide an entrance or exit point for an animal. It is appreciated that other suitable means for inserting attractant 630, removing attractant 630, or both may be provided in trap 100, such as, for example, a slideable tray that receives an attractant, or a groove for receiving a pre-baited device.

In various exemplary embodiments, the triggering mechanism 600 may be configured to provide a line of sight to the attractant 630, so that the animal may see the attractant 630. It is believed that by providing a line of sight to the attractant 630, an animal should be more likely to advance toward the attractant 630, and therefore more likely to trigger the triggering mechanism 600. For example, in an exemplary embodiment illustrated in FIG. 8, the triggering mechanism 600 may have on its actuating portion 604, an edge or lip 610, to provide such a line of sight. As illustrated in FIG. 8, at least a part of the edge 610 may be concave. In other embodiments, substantially the entire edge 610 may be concave.

In various exemplary embodiments, the triggering mechanism 600, once triggered by an animal, may directly or indirectly release the latching mechanism 500 from its latched position. For example, in exemplary embodiment shown in FIGS. 3-5, the triggering mechanism 600 may be rigidly connected to the latching member 500. The triggering member 600 may be pivotally coupled with the second housing member 300, so that when the triggering mechanism 600 is manipulated by an animal, the triggering member 500 pivots, thereby pivoting the latching member 500 until prong 510 releases from the first housing member 200. In other exemplary embodiments, the latching member 500 may be indirectly actuated by the triggering mechanism 600. For example, one or more intermediate mechanisms may be provided between the trigger actuating portion 604 and the latching member 500, whereby manipulation of the actuation portion 606 of the triggering mechanism 600, sets off one or more of the intermediate mechanisms, which in turn release the latching member 500.

In exemplary embodiments having a triggering mechanism 600 like the one illustrated in FIG. 8, it is believed that the weight distribution of the triggering mechanism 600 about the pivot axis 606 may affect the effectiveness of the triggering mechanism 600. For example, the triggering mechanism 600 may have a center of gravity, which lies on axis 608, which does not coincide with pivot axis 606. Without being limited by a specific theory, it is believed that when the two axes 606, 608 coincide, the triggering mechanism 600 may be too sensitive, and may trigger with too slight of an action, in some cases causing the trap 100 to mis-fire without trapping an animal. Therefore, in various exemplary embodiments, the center of gravity axis 608 may be spaced at a pre-determined distance from the pivot axis 606. In some exemplary embodiments, the center of gravity axis 608 may be located toward the actuating portion 604 of the triggering mechanism 600. Without being limited to a specific theory, it is believed that by locating the center of gravity toward the actuating portion 604 of the triggering mechanism 600, the trigger mechanism 600 may require slightly more effort to manipulate and actuate, causing a more predictable triggering action. The methods of determining the location of the center of gravity axis 608 relative to the pivot axis 606 will be appreciated by those familiar with such devices.

It is understood that other suitable triggering mechanisms 600 may be provided, such as, for example, a triggering mechanism 600 that actuated by an animal stepping on a trigger, or a triggering mechanism 600 that may be triggered by an electronic sensing device. While the action of such triggering devices will differ from the triggering mechanism 600 described above, suitable triggering mechanisms 600 should be effective at directly or indirectly compressing or collapsing the trap 100 to its closed position, such as by releasing the latching member 500 from its latched position, causing the first and second housing members 200, 300, to compress or collapse toward each other under a biasing force.

As mentioned above, when the latching member 500 is released from the latched position, one or both housing members 200 and 300 slide toward each other, collapsing or compressing the trapping enclosure therebetween. In the closed position, the one or more openings 240 may be substantially closed or blocked, confining an animal inside the trap 100. In exemplary embodiments, the biasing mechanism 400 should provide sufficient action so that the first and second housing members 200, 300 may collapse almost simultaneously with the release of the latching mechanism 500. In addition, the biasing mechanism 400 should provide sufficient force so that when the trap 100 is in the closed position, an animal trapped inside cannot manipulate on or both of the first and second housing members 200, 300 and open them. The various means for determining an appropriate biasing force and action to satisfy the objectives disclosed herein will be understood. It will be appreciated that there are numerous devices that may be suitable for providing the biasing mechanism 400.

In various exemplary embodiments, the trap 100 may have additional elements to immobilize an animal trapped inside. For example, as illustrated in FIGS. 1A-1B, second housing member 300 may have a plurality of immobilizing members 370 extending into the trapping enclosure. Immobilizing members 370 may be connected to or project from any portion of the enclosure, such as from the side 321, base, 310, or upper wall 322. Similarly, first housing member 200 may optionally have one or more immobilizing members 270 extending into the trapping enclosure. In various exemplary embodiments, the immobilizing members 270, 370 may be rigid or substantially rigid projections, having rounded, blunt, or sharp ends. In exemplary embodiments, when the trap 100 is in the closed position, the immobilizing members 270, 370 restrict the area within the trapping enclosure, further restricting the movement of the animal within the enclosure. In various embodiments, the immobilizing members 270, 370, may come in direct contact with the animal, crushing it, compressing it, impaling it, or otherwise immobilizing it. It will be appreciated that other suitable means may be provided to immobilize an animal inside the closed trap, such as, for example, adhesive or electrical means.

In various exemplary embodiments, the trap 100 disclosed herein may be configured for a single use. Accordingly, it is preferred that the trap 100 and its members are made of a relatively inexpensive material, such as a thin-walled rigid polymeric material that may be injection molded in to the desired shapes. For example, the first and second housing members preferably are made of a polymeric material, such as rigid styrene polymers and co-polymers. Other suitable materials include acrylonitrile-butadiene-styrene (ABS), or polyvinyl-chloride (PVC). It is appreciated that other suitable polymeric materials may be selected for the construction of the trap 100 or its component parts.

In certain exemplary embodiments, each of the component parts described herein are injection molded to a desired shape. In some exemplary embodiments, each component part may be molded as a single, unitary molded part. In other exemplary embodiments, the component part may be molded in multiple parts that are joined or attached together to form the component part. The various means for designing molds, and joining various parts to form one component part will be understood by one familiar with such processes and parts.

In the preceding specification, various preferred exemplary embodiments have been described with reference to the accompanying drawings. It will, however, be evident that various modifications and changes may be made thereto, and additional exemplary embodiments may be implemented, without departing from the broader scope of the invention as set forth in the claims that follow. The specification and drawings are accordingly to be regarded in an illustrative rather than restrictive sense.

What is claimed is:

1. A rodent trap having an open position and a closed position, comprising:
    a first housing member and a second housing member that are slidingly engaged and define a collapsible trapping enclosure therebetween;
    at least one opening in one of said first and second housing members, wherein said opening is substantially unobstructed in said open position an is substantially obstructed in said closed position;
    a biasing mechanism operably coupled with said first and second housing members, biasing said trap toward said closed position;
    a latch that, when latched, holds said trap in said open position; and
    a trigger disposed at least partially inside said trapping enclosure that, when triggered, causes the trap to move from its open position toward its closed position by releasing the latch from its latched position;
    wherein after the trap is triggered by a rodent, the first housing member and the second housing member directly contact the rodent, immobilizing the rodent therebetween.

2. The rodent trap of claim 1, wherein the biasing mechanism comprises at least one tension spring extending between said first and second housing members.

3. The rodent trap of claim 1, wherein the biasing mechanism comprises at least one elastomeric member.

4. The rodent trap of claim 1, wherein the trigger is pivotally coupled with one of said first and second housing members at a pivot axis.

5. The rodent trap of claim 4, wherein said trigger has a center of gravity that is spaced a predetermined distance from said pivot axis.

6. The rodent trap of claim 1, further comprising an attractant disposed inside of the trapping enclosure.

7. The rodent trap of claim 6, wherein said attractant is selected from the group consisting of a food bait, a chemical bait, a fragrance, a rodenticide, and any mixture or combination thereof.

8. The rodent trap of claim 6, further comprising an opening in one of said first or said second housing members for inserting or removing said attractant.

9. The rodent trap of claim 6, wherein said trigger is at least partially disposed between said attractant and said at least one opening.

10. The rodent trap of claim 9, wherein said trigger has a shape that provides a line of sight to said attractant.

11. The rodent trap of claim 1, comprising a rigid polymeric material.

12. The rodent trap of claim 1, wherein at least one of the first housing member and second housing member comprises at least one immobilizing member disposed on the interior of the trapping enclosure, that is adapted to constrain the rodent after the trap is triggered.

13. The rodent trap of claim 12, wherein the at least one immobilizing member comprises at least one flange extending from a surface inside the first housing member.

14. The rodent trap of claim 12, wherein the at least one immobilizing member comprises at least one flange extending from a surface inside the second housing member.

15. The rodent trap of claim 12, wherein the at least one immobilizing member comprises at least one substantially rigid flange extending from a surface inside the first housing member.

16. The rodent trap of claim 12, wherein the at least one immobilizing member comprises at least one substantially rigid flange extending from a surface inside the second housing member.

* * * * *